United States Patent
Lin (10) Patent No.: US 7,106,753 B2
(45) Date of Patent: Sep. 12, 2006

(54) INTERPOLATED TIMING RECOVERY SYSTEM FOR COMMUNICATION TRANSCEIVERS

(75) Inventor: Leon Chia-Liang Lin, Union City, CA (US)

(73) Assignee: Infineon Technologies, Inc., Munich (DE)

( * ) Notice: Subject to any disclaimer, the term of this patent is extended or adjusted under 35 U.S.C. 154(b) by 962 days.

(21) Appl. No.: 10/057,501

(22) Filed: Jan. 25, 2002

(65) Prior Publication Data

US 2003/0142687 A1 Jul. 31, 2003

(51) Int. Cl.
*H04L 12/66* (2006.01)
*H04L 12/28* (2006.01)

(52) U.S. Cl. ........................ 370/463; 370/419
(58) Field of Classification Search ............... 370/513, 370/516, 517, 512, 518, 509
See application file for complete search history.

(56) References Cited

U.S. PATENT DOCUMENTS

| 5,768,281 | A  | * | 6/1998  | Takano ........................ 370/503 |
| 5,864,545 | A  | * | 1/1999  | Gonikberg et al. .......... 370/286 |
| 6,414,952 | B1 | * | 7/2002  | Foley ........................... 370/352 |
| 6,452,948 | B1 | * | 9/2002  | McCallister et al. ........ 370/503 |
| 6,459,746 | B1 | * | 10/2002 | Agazzi et al. ............... 375/371 |
| 6,560,276 | B1 | * | 5/2003  | Long et al. .................. 375/222 |
| 6,954,490 | B1 | * | 10/2005 | Chan ........................... 375/216 |
| 2002/0167923 | A1 | * | 11/2002 | Sendonaris et al. .......... 370/335 |
| 2004/0202205 | A1 | * | 10/2004 | Sheth et al. ................. 370/539 |

OTHER PUBLICATIONS

"Introduction to Digital Filters". © 2002, www.netrino.com/Publications/Glossary/Filters.html.*

* cited by examiner

*Primary Examiner*—Ricky Q. Ngo
*Assistant Examiner*—Warner Wong
(74) *Attorney, Agent, or Firm*—Eschweiler & Associates, LLC (57) ABSTRACT

Interconnected master and slave transceivers provide data communication between host computers. Each transceiver receives and encodes elements of a first data sequence from its local host computer at a first rate and employs a finite impulse response (FIR) filter to interpolate elements of the encoded first data sequence to produce elements of a second data sequence at a higher second rate controlled by a local clock signal. The second data sequence controls the amplitude of an analog signal sent to the other transceiver. Each transceiver also processes the analog signal arriving from the other transceiver to produce elements of a third data sequence at that second rate and employs a second FIR filter for Interpolating the third data sequence to produce elements of a fourth data sequence at the slower first rate. Fourth data sequence elements are then decoded to produce elements of a fifth sequence forwarded to the local host computer at the first rate.

20 Claims, 5 Drawing Sheets

INTERPOLATED TIMING RECOVERY SYSTEM FOR COMMUNICATION TRANSCEIVERS

BACKGROUND OF THE INVENTION

1. Field of the Invention

The present invention relates in general to data communication transceivers and in particular to an interpolated timing recovery system for synchronizing communications between two transceivers.

2. Description of Related Art

The IEEE 802.3ab ("Ethernet") standard defines a digital media interface commonly used for transmitting data between computers linked through a network. The standard includes a "1000BASE-T" protocol enabling transceivers to communicate with one another through pulse amplitude modulation (PAM) signals conveyed on a set of four category 5 (CAT5) unshielded twisted-pair (UTP) conductors. A transceiver operating in accordance with the 1000BASE-T protocol can concurrently transmit and receive one 8-bit word every 8 nsec, thereby providing an effective communication rate of one Gigabit per second in both directions.

Figure 1:
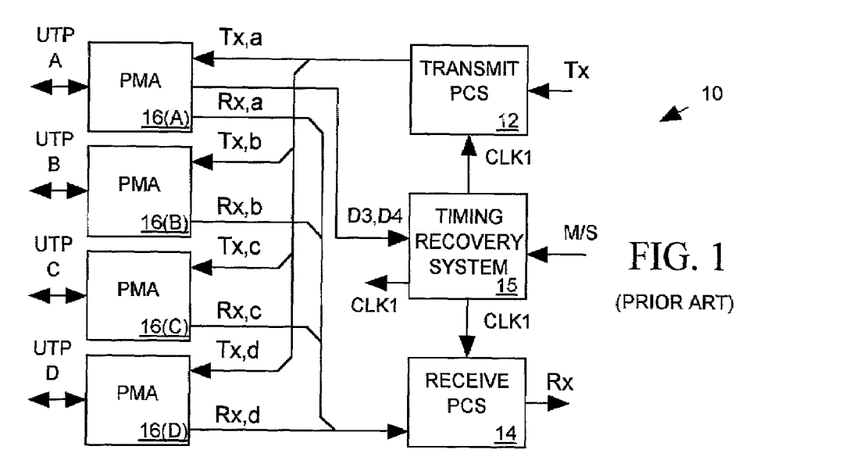
FIG. 1 illustrates a prior art transceiver in block diagram form.

FIG. 1 illustrates a prior art 1000BASE-T transceiver 10 in block diagram form. Transceiver 10 includes a transmit physical coding sublayer (PCS) 12 for scrambling and encoding an incoming sequence of 8-bit words Tx to produce four sequences of 3-bit data words Tx,a-Tx,d, each of which is an integer value of the set {−2, −1, 0, +1 or +2}. Each data word Tx,a-Tx,d is supplied as input to a separate one of a set of four "physical medium attachment" (PMA) units 16(A)–16(D), and each PMA unit 16(A)–16(D) generates an output 1000BASE-T signal on a corresponding one of four UTPs A–D in response to its input data sequence Tx,a-Tx,d. Each PMA unit 16(A)–16(D) also detects a data sequence conveyed by an incoming 1000BASE-T signal transmitted by a remote transceiver on its corresponding UTP A-D and supplies that data sequence Rx,a-Rx,d to receive PCS 14. Receive PCS 14 de-scrambles and decodes the four Rx,a-Rx,d data sequences from PMAs 16(A)–16(D) to produce a single 8-bit output data word sequence Rx matching the remote transceiver's 8-bit input data sequence.

PCS 12, PCS 14, PMAs 16 and the remote transceiver all operate synchronously at the 125 MHz rate with which data is forwarded on UTPs A–D. When an input M/S signal tells transceiver 10 to act as a "master", a timing recovery system 15 supplies a free running 125 MHz clock signal CLK1 to transmit PCS 12, receive PCS 14 and PMAs 16 for controlling the timing of their operations. The remote transceiver, acting as a slave, synchronizes its own internal 125 MHz clock to CLK1 based on the timing with which data arrives from transceiver 10. Conversely, when the M/S signal tells local transceiver 10 to act as the slave, timing recovery system 15 adjusts the frequency and phase of its output clock signal CLK1 based on the timing of data streams D3, D4 PMA 16(A) derives from the signal arriving on UTP A from the remote transceiver.

Figure 2:
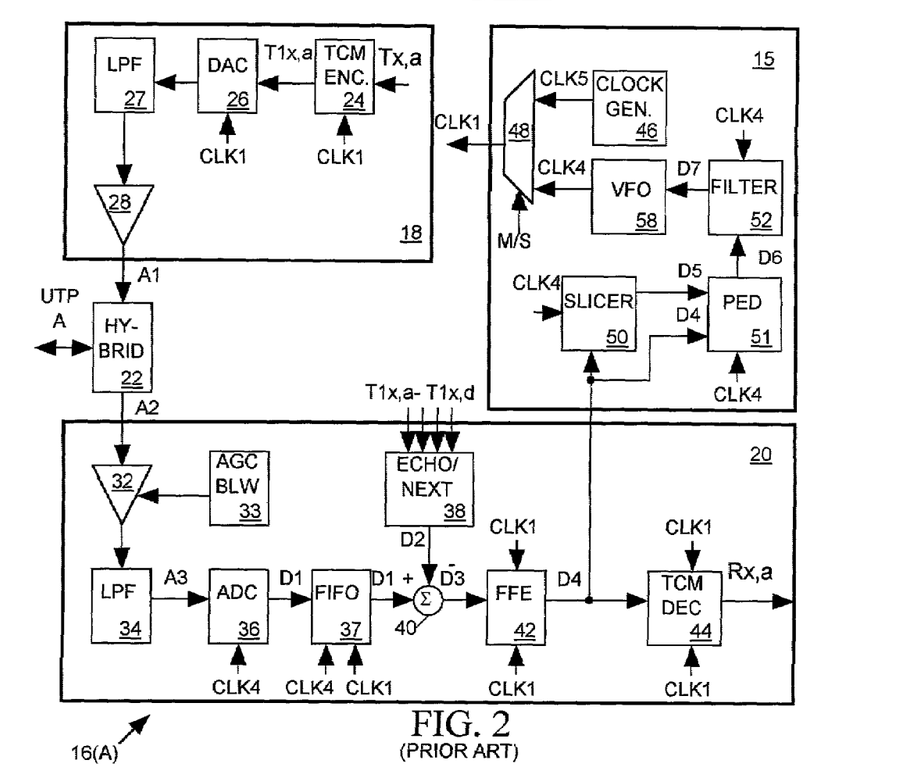
FIG. 2 illustrates one of the physical media attachment (PMA) units and the timing recovery system of FIG. 1 in more detailed block diagram form, FIG. 3 a communication system in accordance with the invention.

FIG. 2 illustrates prior art PMA 16(A) and timing recovery system 15 of FIG. 1 in more detailed block diagram form; PMAs 16(B)–16(D) of FIG. 1 are similar. PMA 16(A) includes a transmitter 18 for sending an analog signal A1 outward on UTP A in response to the incoming 3-bit Tx,a data sequence, a receiver 20 for generating the 3-bit output data sequence Rx,a in response to an incoming 1000BASE-T signal A2 arriving on UTP A, and a "hybrid" circuit 22 for coupling the transmitter and receiver to UTP A.

Transmitter 18 includes a trellis code modulation (TCM) encoder 24 for converting the incoming Tx,a data sequence into a 125 MHz data sequence T1x,a indicating the voltage of each successive level of the outgoing analog signal A1. A digital-to-analog converter (DAC) 26 converts each word of the partial response sequence output T1x,a to a voltage, a low pass filter (LPF) 27 smoothes the DAC output signal, and a driver 28 amplifies the output of LPF 27 to produce the analog signal A1 transmitted outward on UTP A via hybrid 22 to the remote transceiver.

Hybrid 22 passes an incoming analog signal arriving on UTP A from the remote transceiver as an analog signal A2 input to receiver 20. Receiver 20 includes an amplifier 32 for amplifying the A1 signal with an adjustable gain and offset. A low pass filter 34 removes high frequency noise from the amplifier output signal to produce an analog signal A3. An analog-to-digital converter (ADC) 36 digitizes the A3 signal to produce a sequence of data elements D1 representing successively sampled magnitudes of the A3 signal. Automatic gain control (AGC) and baseline wander (BLW) control circuits 33 control the gain and offset of amplifier 32 to keep the peak-to-peak amplitude of the analog signal A3 near the full input range of ADC 36.

A clock signal CLK4 synchronized to the remote transmitter's CLK1 signal clocks ADC 36. The CLK4 signal shifts each element of the D1 sequence into a first-out (FIFO) buffer 37 and the local CLK1 clock signal shifts the D1 sequence out of FIFO buffer 37.

The amount of echo distortion of the incoming A2 signal is proportional to the magnitude of the A1 signal transmitter 18 is currently sending outward on UTP A. The amount of near end crosstalk (NEXT) distortion in the incoming A2 signal is proportional to the magnitude of the outgoing A1 signals currently being transmitted outward by transmitters within the other three PMAs 16(B)–16(D) of FIG. 1. An echo/NEXT canceller circuit 38 monitors the T1x,a -T1x,d data sequences produced by all four transmitters and supplies an offset data sequence D2 to a summer 40 representing the magnitude of echo and NEXT distortion in the incoming signal.

A summer 40 subtracts the D2 sequence generated by echo/NEXT canceller 38 from data sequence D1 output of FIFO buffer 37 to produce a data sequence D3 that is compensated for echo and NEXT distortion. An adaptive feed forward equalizer (FFE) 42 compensates the D3 sequence for channel response (distortions introduced by the incoming signal path) to produce a sequence D4. A trellis code modulation decoder 44 decodes the D4 sequence to produce an Rx,a sequence supplied to PCS 14 of FIG. 1 replicating the Tx,a input sequence of the remote transceiver's A channel PMA.

The 125 MHz clock signal CLK1 output of timing recovery system 15 clocks all of the digital components of transmitter 18 and receiver 20 that operate at 125 MHz. Timing recovery system 15 includes a clock signal generator 46 for producing a free-running 125 MHz clock signal CLK5 and a variable frequency oscillator (VFO) 58 for producing a 125 MHz clock signal CLK4 that is frequency locked to the remote transceiver's CLK1 signal. A multiplexer 48 controlled by the M/S signal selects the CLK5 signal as the source of clock signal CLK1 when the transceiver operate as master and selects the CLK4 signal as the source of clock signal CLK1 when the transceiver operates as slave.

VFO 58 produces clock signal CLK4 at a frequency controlled by input data D9 produced by devices 50–52 in response to the "soft decision" data D4 sequence output of FFE 42 which represents the data conveyed by the incoming A2 signal. When transceiver 10 is operating in the slave mode, elements of the data sequence D4 appear at the remote transceiver's 125 MHz clock rate. A slicer 50 "rounds off" each 8-bit data sequence element D4 output of FFE 42 of receiver 20 to produce a corresponding 3-bit "hard decision" data sequence element D5 representing the nearest integer value which acts as an estimate of the integer value of the D4 data. When the phase and frequency of clock signal CLK4 are correctly adjusted, the current D4 sequence element will be a whole number and will match D5. When the phase of clock signal CLK4 signal is incorrect, the current D4 sequence element will have a fractional component and will be larger or smaller than is corresponding D5 sequence element. Characteristic patterns in differences in between corresponding D4 and DS elements are indicative of phase errors in clock signal CLK4 relative to 125 MHz clock rate of the D4 data. A phase error detector (PED) 51 processes the D4 and D5 sequences to generate data D6 representing the phase error and a filter 52 smoothes the D6 sequence to produce a data sequence D7. The D7 data output of filter 52, which represents the error in the phase of clock signal CLK4, acts as input to VFO 58 and finely adjusts the phase and frequency of clock signal CLK4 to frequency lock it to the remote transceiver's CLK1 signal.

The CLK4 signal is somewhat jittery since VFO 58 is controlled by a feedback loop. Jitter in clock signal CLK4 introduces distortion the D1 sequence output of ADC 36 and such distortion affects the performance of the FFE 42 since a conventional FFE's ability adapt to the predictable channel response distortion is degraded when confronted with unpredictable distortion resulting from random variations in phase of the transceiver's sampling clock. The degradation in FFE performance increases the probability of data transmission errors. Also, when the transceiver is acting in the slave mode, the CLK1 signal supplied to DAC 26 is somewhat jittery because it is derived from the jittery CLK4 signal. Such jitter in the CLK1 input to DAC 28 causes unpredictable distortion in the analog signal A1 sent to the remote transceiver and further adds to the difficulty for the remote transceiver's FFE has in adapting to the channel response.

What is needed is a transceiver architecture allowing two transceivers to communicate with one another even though they concurrently employ free-running clock signals to control the rate at which they encode data into the analog output signals they transmit and to control the rate at which they digitize the analog signals they receive.

BRIEF SUMMARY OF THE INVENTION

Interconnected master and slave transceivers in accordance with the invention provide data communication between host computers. Each transceiver receives and encodes elements of a first data sequence supplied by its local host computer at a first rate (e.g. 125 MHz) controlled by a local clock signal (CLK3) and employs a first finite impulse response (FIR) filter to interpolate elements of the encoded first data sequence to produce elements of a second data sequence at a higher second rate (e.g. 147.825 MHz) controlled by a free-running second local clock signal (CLK1L). The second data sequence produced by each transceiver controls the amplitude of an analog signal sent to the other transceiver.

Each transceiver digitizes the analog signal arriving from the other transceiver at the second rate in response to its local clock signal CLK1L and processes the resulting data sequence to produce elements of a third data sequence at the high second rate.

Each transceiver employs a second FIR filter for interpolating the third data sequence to produce elements of a fourth data sequence and decodes the fourth data sequence to reproduce the first data sequence input to the other transceiver and forwards that sequence to its local host computer at the slower first rate of its local CLK3 clock signal.

A clock recovery system within the master transceiver derives its local CLK3 signal using its local CLK1 signal as a timing reference. The clock recovery system within the slave transceiver processes the fourth data sequence to recover the timing of the master transceiver's local clock signal CLK1, and adjusts the phase and frequency of its local clock CLK3 using the recovered master transceivers CLK1 clock signal as a timing reference.

The timing recovery system in the master and slave transceivers adjust the coefficients of the transceivers' first and second FIR filters so that they interpolate their input sequences with weighing that is a function of the relative phase of their local CLK1 and CLK3 clock signals. Instead of adjusting the timing slave transceiver's local clock CLK1 which controls the timing with which analog signals are encoded and digitized, the slave transceiver's timing recovery system adjusts the FIR filter coefficients to account for differences in the master and slave transceiver's local clocks. Since the CLK1 clock signals in both the master and slave transceivers are free running and not controlled by feedback loops, they can be substantially jitter-free and will not introduce jitter-related distortion into the analog signals.

It is accordingly an object of the invention to provide transceivers that can communicate with each other by encoding data into an outgoing analog signal sent to the other transceiver and by recovering data encoded into an incoming analog signal received from the other transceiver.

It is another object of the invention to provide transceivers that can communicate with one another even though both employ independent, free-running clocks to control the rate at which they encode data into their outgoing analog signals and the rate at which they digitize the incoming analog signals.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

Transceiver Architecture

Figure 3:
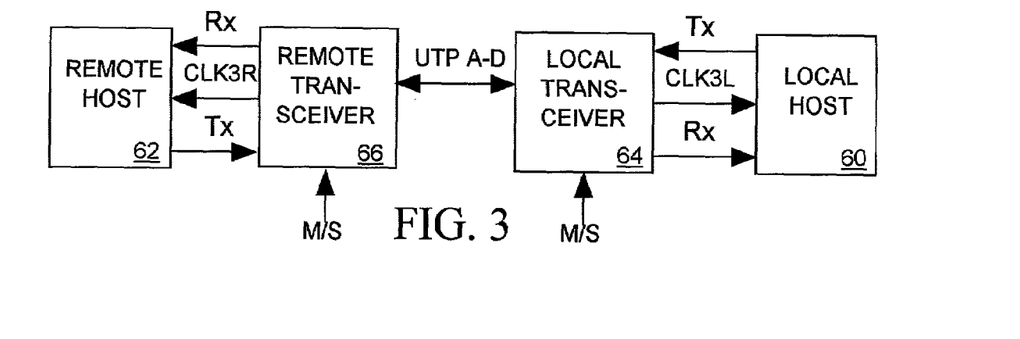

FIG. 3 illustrates a communication system in accordance with the invention for enabling a local host computer 60 to communicate with a remote host computer 62 through a pair of similar transceivers 64 and 66. Local host computer 60 sends a 125 MHz data sequence Tx to local transceiver 64 which encodes that sequence into a set of four analog signals sent to remote transceiver 66 via a set of four UTPs A-D. Remote transceiver 66 processes the four analog signals to recover the data sequence and forwards it as a 125 MHz data input sequence Rx to remote host 62. At the same time, remote host 62 sends a 125 MHz data sequence Tx to remote transceiver 64 which encodes that sequence into four analog signals sent to a local transceiver 66 via UTPs A-D. Local transceiver 64 process the four analog signals to recover the encoded data sequence and forwards it as a 125 MHz data input sequence Rx to local host 60.

Local transceiver 64 supplies a 125 MHz clock signal CLK3L to local host 60 for controlling the rate at which the local host sends and receives elements of the Tx and Rx data sequences. Remote transceiver 66 supplies a similar clock signal CLK3R to remote host 62 for the same purpose. If the 125 MHz clock signals produced by the local and remote transceivers 64 and 66 were independent of one another, then it is likely that local host and remote hosts 60, 62 will communicate at slightly different rates because clock signals from independent sources will likely have slightly different frequencies. Thus to make sure that the local and remote hosts 60 and 62 communicate at the same rate, one of remote and local transceivers 64 and 66 must adjust clock signal CLK3L so that its average frequency matches the average frequency of the remote clock signal CLK3R. Accordingly control signal (M/S) inputs to transceivers 64 and 66 tell one of the transceivers to act as "master" and the other to act as "slave". The master transceiver allows its clock signal CLK3 to free run at 125 MHz while the slave transceiver adjusts its CLK3 clock signal frequency to track the master's CLK3 clock signal frequency. While the local and remote transceivers 64 and 66 are unable to directly monitor each other's CLK3 clock signal, as explained below, the slave transceiver is able to detect ("recover") the frequency of the master's CLK3 clock signal by monitoring analog signal transmitted from remote transceiver 66 on UTP A. In particular the frequency with which the analog signal arriving from the master transceiver transitions between various levels indicates the phase and frequency of a master clock from which the master transceiver derived its CLK3 clock signal. The slave transceiver is able to appropriately adjust the frequency of its local CLK3 clock signal based on knowledge of the phase and frequency of the master transceiver's master clock.

Figure 4A:
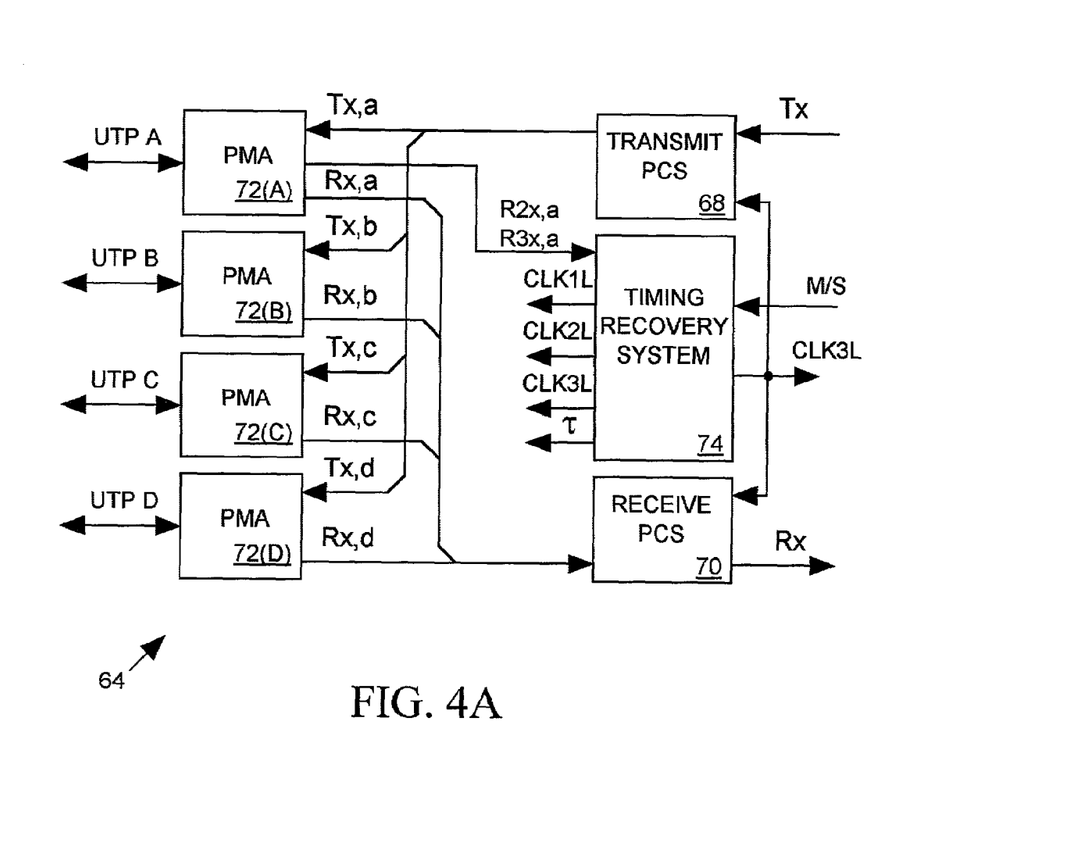
FIG. 4A illustrates the local transceiver of FIG. 3 in block diagram form.
Figure 4B:
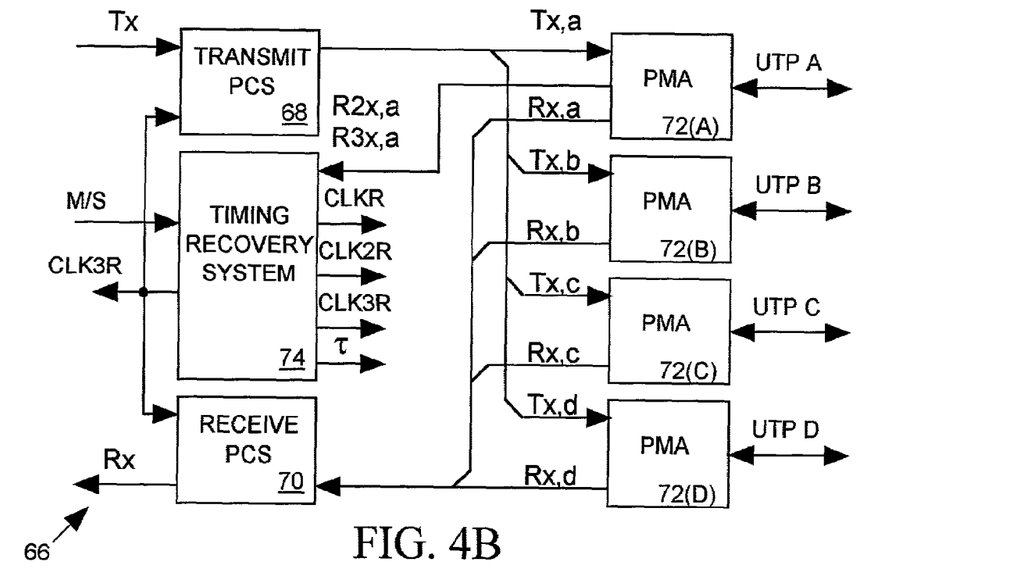
FIG. 4B illustrates the remote transceiver of FIG. 3 in block diagram form.

FIGS. 4A and 4B illustrate local and remote transceivers 64 and 66 of FIG. 3 in more detailed block diagram form.

Local transceiver 64 of FIG. 4A includes a conventional transmit physical coding sublayer (PCS) 68 for scrambling and encoding the incoming 125 MHz sequence of 8-bit words Tx from local host 60 to produce four sequences of 3-bit data words Tx,a-Tx,d, each of which is an integer value of the set {−2, −1, 0, +1 or +2}. Each data word sequence Tx,a-Tx,d is supplied at the 125 MHz rate set by the local CLK3L clock signal as input to a separate one of a set of four "physical medium attachment" (PMA) units 72(A)–72(D), and each PMA unit 72(A)–72(D) generates an outgoing analog signal on a corresponding one of four UTPs A-D in response to its input data sequence Tx,a-Tx,d. Each PMA unit 72(A)–72(D) also detects a data sequence conveyed by an incoming analog signal transmitted by remote transceiver 66 on its corresponding UTP A-D and supplies that data sequence Rx,a-Rx,d at the 125 MHz CLK3L clock signal rate to a receive PCS 70. Receive PCS 70 de-scrambles and decodes the four Rx,a-Rx,d data sequences from PMAs 72 to provide local host 60 with an input 125 MHz, 8-bit data word sequence Rx matching the remote transceiver's 8-bit 125 MHz Tx data sequence.

A timing recovery system 74 supplies a set of three clock signals CLK1L-CLK3L for controlling the timing of events in PMAs 720, PCS 68 and PCS 70. Clock signal CLK1L free runs at 143.857 MHz (+/−100 ppm) regardless of whether local transceiver 64 acts as the master or as the slave. When the transceiver operates in the master mode, where timing recovery system 74 derives the 125 MHz CLK3L signal solely from the CLK1L signal, the 143.857 MHz CLK1L clock signal frequency is exactly $8/7$ths that of the 125 MHz CLK3L clock signal. When the transceiver operates in the slave mode, timing recovery system 74 frequency locks the CLK3L signal to the remote transceiver's CLK3R signal. Thus in the slave mode, the 143.857 MHz CLK1L clock signal may not be exactly $8/7$th the frequency of the 125 MHz CLK3L clock signal since the CLK1L clock signal and the CLK3R signal (to which the CLK3L signal is frequency locked) are not coherent.

Timing recovery system 74 derives the CLK2 clock signal by masking on average approximately 8th pulse of the CLK1L clock signal, so that its pulses occur with an average rate of 125 MHz or $(7/8)*143.857$ MHz. As described below, the CLK1L and CLK2L clock signals clock logic operations within PMAs 72. In particular free-running, non-coherent, local and remote clock signals CLK1L and CLK1R control the timing with which the transceivers encode data into the analog signals they send to each other and the timing with which they digitize the analog signals the receive from each other.

As discussed above, the 125 MHZ CLK3L clock signal controls the transfer of data between PMAs 72, transmit PCS 68, receive PCS 70 and local host 60. The 125 MHz CLK3R clock signal carries out a similar function in the remote transceiver. When the M/S signal indicates local transceiver 64 is to act as the master, timing recovery system 74 does not attempt to adjust the local CLK3L clock signal frequency to match that of the remote (slave) transceiver's CLK3R clock signal; it derives the CLK3L clock signal using the local free-running CLK1L clock signal as a timing reference so that frequency of the CLK3L clock signal depends only on the frequency of the local CLK1L clock signal. However when the M/S signal indicates that local transceiver 64 is to act as the slave, timing recovery system 74 periodically adjusts the period of the CLK3L clock signal to eliminate differences average frequency of the local CLK3L and remote CLK3R clock signals. As discussed in more detail below, timing recovery system 74 recovers the timing of the remote master transceiver's free running CLK1 clock signal (CLK1R) by monitoring a pair of data sequences R2x,a and R3x,a that PMA 72(A) produces in the process of generating the Rx,a data sequence it derives from the analog signal arriving from remote transceiver 66. Since the remote master's CLK3R clock signal is derived from its free-running CLK1R clock signal, the local slave's timing recovery system 74 is able to adjust the local CLK3L clock signal period as necessary to ensure that over time, the local and remote CLK3L and CLK3R clock signals will have the same average period.

Timing recovery system 74 also supplies each PMA 72 with a data sequence τ which, as explained below, enables them to account for phase and frequency differences between the local and remote transceiver's free-running CLK1L and CLK1R clock signals which control the timing with which the they encode data into the analog signals they send to each other and the timing with which they digitize the analog signals the receive from each other.

Remote transceiver 66 of FIG. 4B and local transceiver 64 of FIG. 4A are similar in design and operation.

PMA Architecture

Figure 5:
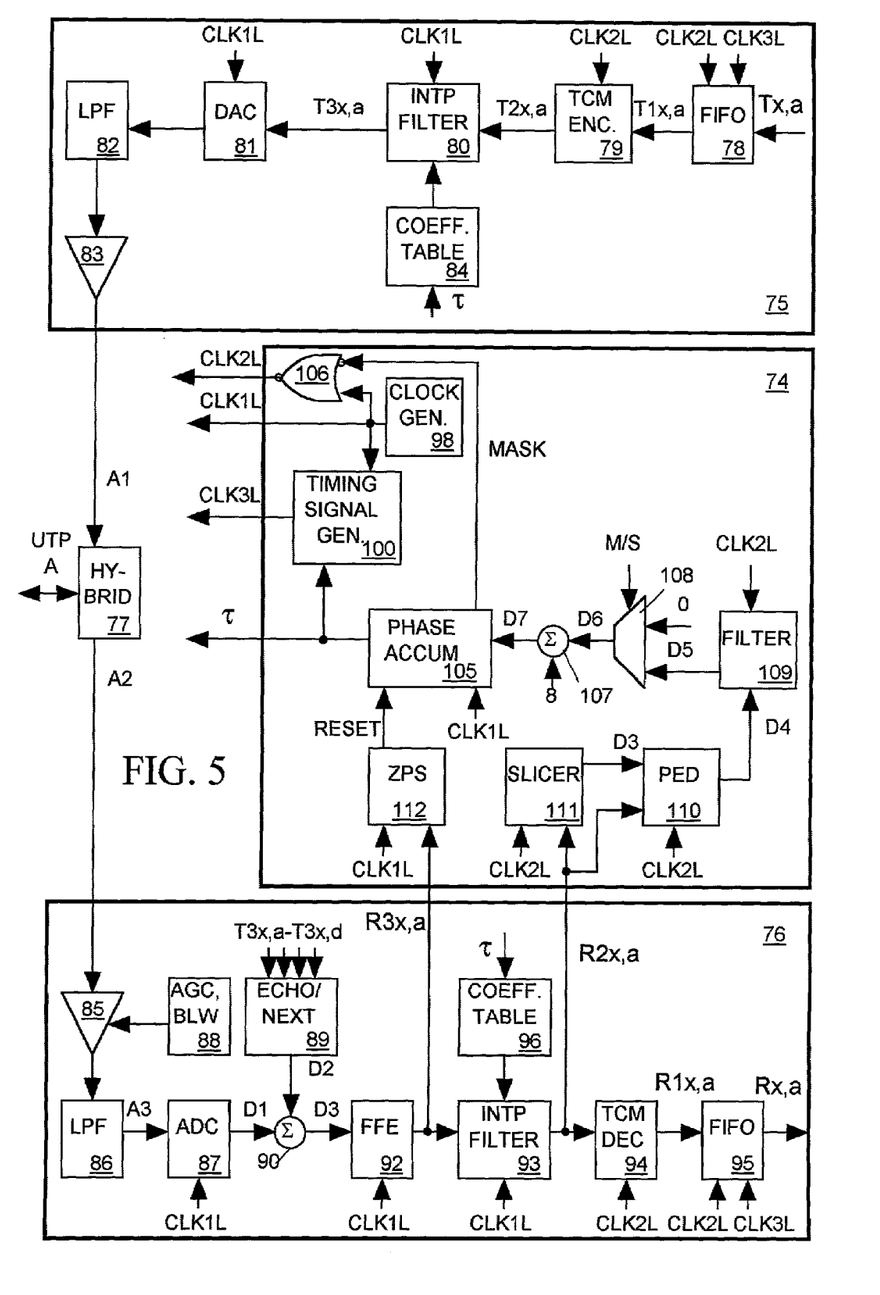
FIG. 5 illustrates one of the PMA units and the timing recovery system of FIG. 4A in more detailed block diagram form.

FIG. 5 illustrates PMA 72(A) and timing recovery system 74 of FIGS. 4A and 4B in more detailed block diagram form; PMAs 72(B)–72(D) of FIGS. 4A and 4B are similar to PMA 72(A). PMA 72(A) includes a transmitter 75 for sending an analog signal outward on UTP A to remote transceiver 66 (FIG. 3) in response to its incoming 3-bit Tx,a data sequence, a receiver 76 for generating the 3-bit output data sequence Rx,a in response to an incoming analog signal arriving on UTP A from the remote transceiver, and a hybrid circuit 77 for coupling transmitter 75 and receiver 76 to UTP A.

Transmitter 75 includes a first-in, first-out (FIFO) buffer 78 for receiving the Tx,a data at the 125 MHz CLK3L clock rate and forwarding it as a sequence T1x,a at the CLK2L clock rate. As mentioned above, the CLK3L clock signal operates at 125 MHz and the CLK2L clock signal operates at 142.857 MHz, or 8/7th of the 125 MHz frequency of the CLK3L clock signal. However one average approximately one pulse in eight of the CLK2 clock signal is masked so that the CLK2L clock signal shifts data out of FIFO buffer 78 at the same average rate (125 MHz) that the CLK3L clock signal shifts data into the FIFO buffer. A trellis code modulation (TCM) encoder 79, clocked by the CLK2L clock signal encodes the data sequence T1x,a shifted out of FIFO buffer 78 to produce a sequence T2x,a supplied as input to an interpolation filter 80 clocked by the CLK1L clock signal.

Filter 80, a finite impulse response (FIR) filter, produces each element of its output sequence T3x,a as a weighted sum of several successive elements of its input T2x,a sequence, with weighting determined by FIR filter coefficients provided by a coefficient table 84. The τ data sequence generated by timing recovery system 74 addresses table 84 thereby controlling the coefficients of interpolation filter 80. A digital-to-analog converter (DAC) 81 converts the 142.857 MHz sequence T3x,a into an analog signal, a low pass filter (LPF) 82 smoothes the DAC output signal, and a driver 83 amplifies the resulting analog signal to produce an analog signal A1 forwarded to hybrid 77 for transmission outward on UTP A.

Figure 6:
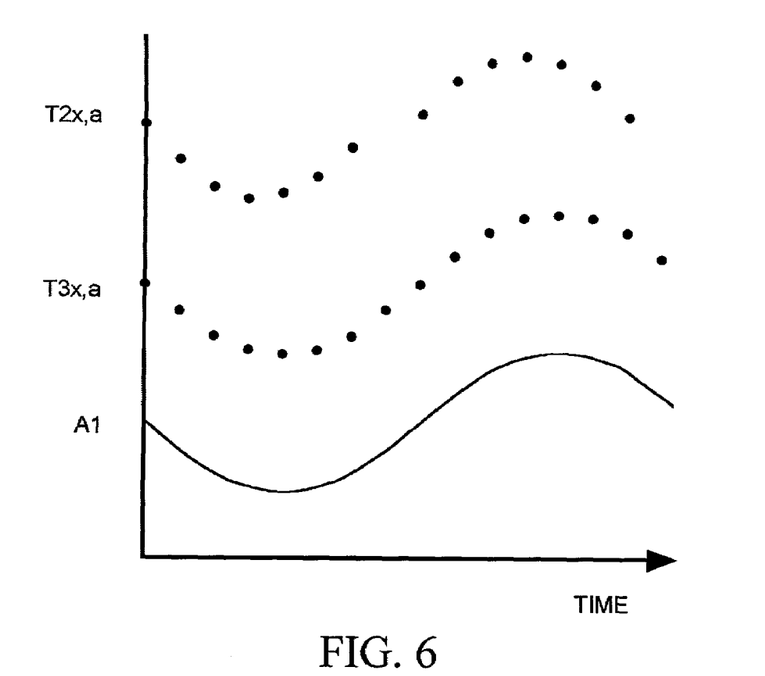
FIG. 6 is a timing diagram illustrating timing relationships between analog and digital signals of FIG. 4A.

FIG. 6 is a timing diagram illustrating relationships between the T2x,a data sequence input to interpolation filter 80, its T3x,a data sequence output, and the resulting outgoing analog signal A1 produced by amplifier 83. As interpolation filter 80 produces each element of the T3x,a sequence, coefficient table 84 adjusts the set of coefficients it supplies to interpolation filter 80 so the T3x,a sequence appears as shown in FIG. 6. The A1 signal varies with time in much the same way it would have varied had the T2x,a sequence been produced at a uniform 125 MHz rate and directly digitized by DAC 81. Interpolation filter 80 corrects for the non-uniform CLK2L clock rate of the T2x,a sequence and also "re-samples" the sequence at the higher 147.857 frequency of clock signal CLK1L. Thus the A1 signal conveys T3x,a data at the 142.857 MHz CLK1L clock rate, rather than at the conventional 1000BASE-T rate of 125 MHz. However since the T3x,a is an encoded and interpolated version of the Tx,a data, the remote transceiver is able to extract the Tx,a sequence from the A1 signal by digitizing the A1 signal and by appropriately interpolating and decoding the resulting sequence in the manner described below.

Hybrid 77 passes an incoming analog signal A2 arriving from remote transceiver 66 via UTP A to receiver 76. Since the remote transceiver includes a transmitter similar to transmitter 75, the incoming signal A2 will represent a 142.857 MHz data sequence that is an encoded and interpolated representation of the 125 MHz Tx,a data sequence remote host 62 (FIG. 3) supplies as input to remote transceiver 66. Receiver 76 includes an amplifier 85 for amplifying the incoming analog signal A2 with an adjustable gain and offset. A low pass filter 86 removes high frequency noise from the amplifier output signal to produce an analog signal A3. An analog-to-digital converter (ADC) 87 digitizes the A3 signal to produce a sequence of data elements D1 representing successive magnitudes of the A3 signal. Automatic gain control (AGC) and baseline wander (BLW) control circuits 88 control the gain and offset of amplifier 85 to keep analog signal A2 appropriately centered and to keeps its peak amplitude near the ADC's full input range.

The amount of echo distortion of the A3 signal is proportional to the magnitude of the A1 signal transmitter 75 is currently sending outward on UTP A. The amount of near end crosstalk (NEXT) distortion in the incoming analog signal is proportional to the magnitude of the A1 signals being transmitted outward by transmitters within the other three PMAs 72(B)–72(D) of FIG. 4A. An echo/NEXT canceller circuit 89 therefore monitors the T3x,a-T3x,d data sequences produced by all four transmitters and supplies an offset data sequence D2 to a summer 90 representing the magnitude of echo and NEXT distortion in the incoming signal. Summer 90 subtracts the D2 sequence the D1 sequence to produce a data sequence D3 that is compensated for echo and NEXT distortion. An adaptive feedforward equalizer (FFE) 92 compensates the D3 sequence for channel response (distortions introduced by the incoming signal path) to produce a 142.857 MHz data sequence R3x,a.

The R3x,a sequence produced by FFE 92 is a 142.857 MHz sequence similar in nature to the T3x,a sequence produced by the interpolation filter 80 of the remote transceiver's channel A transmitter. An interpolation filter 93 interpolates the R3x,a sequence output of FFE 92 to produce a sequence R2x,a similar to the sequence R2x,a sequence produced by the remote transmitter's TCM encoder 79. A coefficient table 96 supplies FIR coefficients to filter 93 in response to the τ output of timing recovery system 74. A TCM decoder 94 decodes the R2x,a sequence to produce a sequence R1x,a that is similar to the T1x,a sequence supplied as input to the TCM encoder 79 of the remote transmitter. The CLK1L clock signal clocks devices 87–93 at the 142.857 MHz rate. However since every 8th element of the R2x,a sequence is a duplicate of the preceding sequence element, the 142.857 MHz CLK2L clock signal (which has every 8th pulse masked) clocks the TCM decoder 94 so that it ignores every 8th element of its input R2x,a sequence. The CLK2L clock signal also shifts each element of the R1x,a sequence into a FIFO buffer 95 at an average rate of 125 MHz and the 125 MHz CLK3L clock signal shifts data out of FIFO buffer 95 at a uniform rate to produce the data sequence Rx,a supplied to receive PCS 70 of FIG. 4A. The Rx,a data sequence matches the Tx,a sequence shifted into the FIFO buffer 78 of the remote transceiver's channel A transmitter 75.

Interpolation Filters

Interpolation filter 80 is suitably implemented, for example, as a 21 tap finite impulse response (FIR) filter wherein the coefficient for each nth tap (for n=−10, −9, −8, . . . +9, +10) is a function of τ as follows:

w(n+τ/56)sinc(n+τ/56)

where sinc(x)=sin($\pi$*x)/$\pi$*x), and w(x) is a Hamming or other suitable windowing function.

Interpolation filter 93 is also suitably implemented as a 21 tap FIR filter wherein the coefficient for each nth tap (for n=−10, −9, −8, . . . +9, +10) is a function of τ as follows:

w(n−τ/64)sinc(n−τ/64) for τ<56, and w(n+1−τ/64)sinc(n+1−τ/64) for τ>=56.

Each interpolation filter produces each output data sequence element as a weighted sum of 21 preceding input data sequence elements with the weighting of each nth element being determined by the nth coefficient. The τ value adjusts the weighting in accordance with the phase relationship between the most recent CLK1L and CLK3L clock signal pulse edges. When local transceiver 64 acts as a master, the τ data sequence is independent of the phase or frequency of the remote CLK1R clock signal. However when local transceiver 64 acts as a slave, timing recovery system 74 continuously adjusts the local CLK3L clock signal frequency so as to frequency lock it to the remote transceiver CLK3L clock signal. Therefore it is necessary to adjust the CLK3L clock signal phase and τ as functions of the recovered remote CLK1R clock signal timing so that interpolation filters 80 and 93 operate with the correct interpolation phase.

Timing Recovery System

Timing recovery system 74 generates clock signals CLK1L-CLK3L for controlling timing of the operations of the various digital components of transmitter 75 and receiver 76. A free-running clock signal generator 98 generates the 142.857 MHz CLK1L clock signal controlling timing of all digital components of transmitter 75 and receiver 76 except TCM encoders 79 and 94 and FIFO buffers 78 and 95, regardless of whether the transceiver acts as a master or a slave. When clock signal CLKLL is free-running and not controlled by a feedback loop, it is substantially jitter-free. The outgoing analog signal A1 produced by transmitter 75 is therefore free of distortion related to jitter in the clock signal controlling DAC 81 and the data sequence D1 produced by digitizing the incoming signal A3 is free of distortion caused by jitter in the clock signal controlling ADC 87. While the conventional FFE 92 compensates the D3 sequence derived from the D1 sequence for channel distortion (distortion of the A2 signal caused by the impedances of its signal path) its performance would be degraded by clock jitter-related distortion in that sequence. Hence the ability of FFE 92 to compensate for channel distortion is improved by making clock signal CLK1L free-running regardless of whether the transceiver is operating in master or slave mode.

As detailed below, timing recovery system 74 derives the CLK3L clock signal from the CLK1L clock signal. When the transceiver is operating in the master mode, the CLK3L clock signal is phase locked to the CLK1L clock signal and has relatively little jitter. However when the transceiver operates in the slave mode, a feedback loop continuously adjusts the phase of the CLK3L clock signal relative to the CLK1L clock signal so that the CLK3L clock signal is phase locked to the remote master transceiver's CLK3R clock signal and has the same average frequency. Since the local CLK3 clock signal phase is controlled by a feedback loop in the slave mode, it is subject to jitter. However CLK3L clock signal jitter does not influence the outgoing A1 or incoming A2 signals and therefore does not interfere with the ability of FFE 92 to carry out its equalization function.

Since the local transceiver's ADC 87 is clocked by the free-running CLK1L clock signal that is not synchronized to the CLK1R clock signal that clocks the remote transceiver's DAC 81, there is no fixed relationship between the times at which ADC 87 digitizes the incoming analog signal and the times at which the remote transceiver's DAC 81 converted data into that signal. Interpolation filter 93 resolves that problem by appropriately interpolating the data stream R3x,a derived from D1 in a manner that accounts for phase differences between the local and remote transceiver's CLK1L and CLK1R clock signals as reflected by the τ output of timing recovery system 74.

Figure 7:
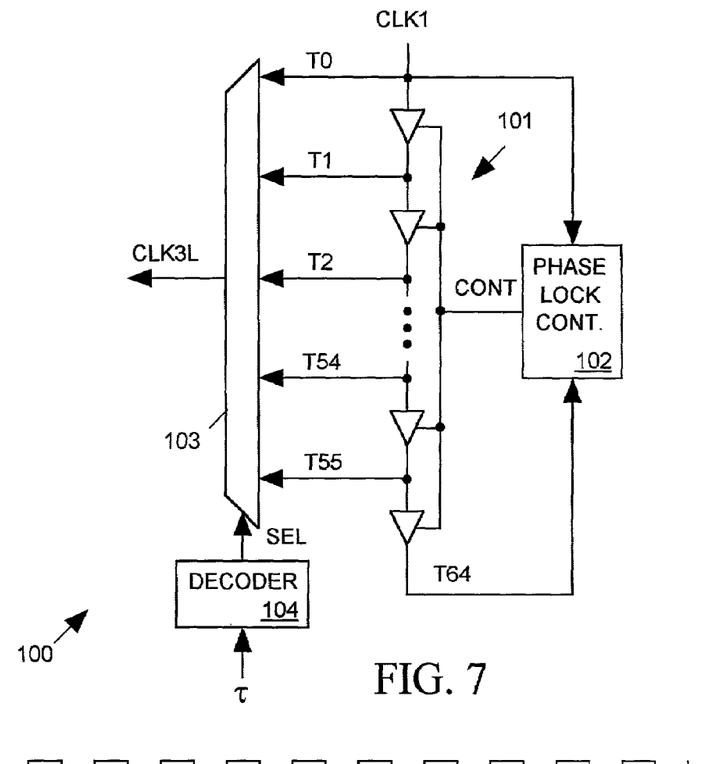
FIG. 7 illustrates the timing signal generator of FIG. 4A in more detailed block diagram form.
Figure 8:
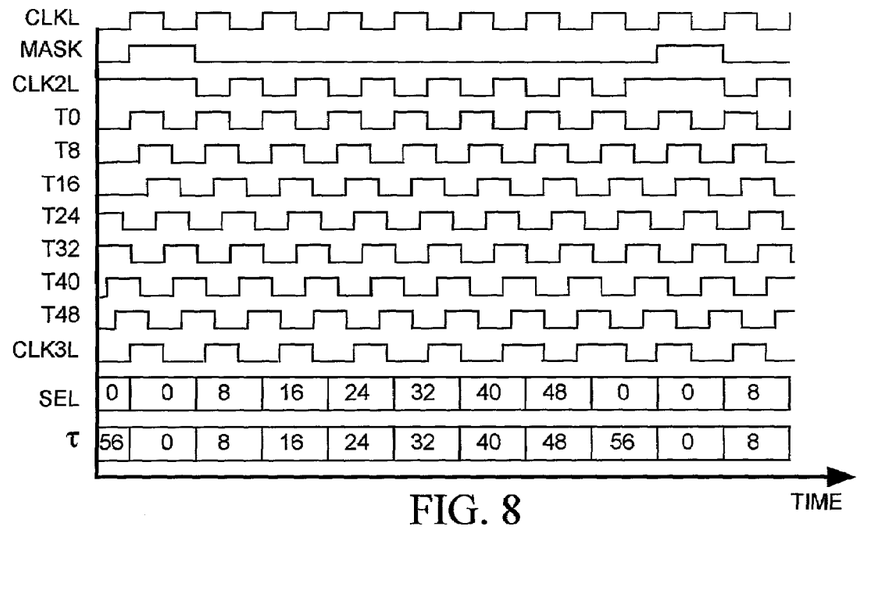
FIG. 8 is a timing diagram illustrating timing relationships between analog and digital signals of FIGS. 5 and 7.

Clock recovery system 74 includes a timing signal generator 100 as detailed in FIG. 7 for producing the CLK3L clock signal in response to the CLK1L clock signal and the τ data sequence. FIG. 8 is a timing diagram illustrating timing relationships between various signals of FIG. 7. Timing signal generator 100 includes a series of 56 logic gates 101, each delaying the CLK1L clock signal by $\frac{1}{56}$th of the period of the CLK1L clock signal to produce a separate one of tap signals T0–T55 at its output. The CLK1L clock signal (acting as tap signal T0) and tap signals T1–T55 are provided as inputs to a multiplexer 103 controlled by the output SEL of a decoder 104 driven by the τ data sequence. The CLK3L clock signal is produced at the output of multiplexer 103.

The switching speed of each logic gate 101 is influenced by its power supply voltage. A phase lock controller 102 adjusts the gate's power supply voltage (CONT) so as to phase lock T56 to T0, thereby ensuring that each gate 101 has a switching delay of $\frac{1}{56}$th of the period of the CLK1L clock signal. Thus all tap signals T0–T55 have the same frequency as clock signal CLK1L but are evenly distributed in phase as illustrated in FIG. 8. When transceiver 64 acts as the master, the value of τ is a repetitive sequence {0,8,16, 24,32,40,56,0,8 . . . } as shown in FIG. 8. Decoder 104 decodes τ to produce data (SEL) controlling multiplexer 103 such that SEL=τ for τ<56 and SEL=0 for τ>=56.

With the clock signal CLK1L frequency being 142.857 MHz, the τ sequence illustrated in FIG. 8 produces the 125 MHz CLK3L clock signal shown in FIG. 8. Although the duty cycle of the CLK3L clock signal varies, its leading edges are periodic at 125 MHz so it can operate as an effective 125 MHz clock signal for clocking the transfer of data in and out of the transceiver.

Referring again to FIG. 5, an accumulator 105 clocked by the CLK1L clock signal accumulates input data D7 to produce the τ data input to timing signal generator 100 and coefficient tables 84 and 96. Since accumulator 105 overflows and starts counting up from 0 after its output reaches 63 τ may have any value between 0 and 63. During any cycle of clock signal CLK1L in which accumulator 105 exceeds 55, it asserts a MASK signal driving an inverting input of a NOR gate 106. The CLK1L clock signal drives a non-inverting input of NOR gate 106, which produces the CLK2L clock signal at its output. Thus the CLK2L clock signal has the same frequency 142.857 as the CLK1L clock signal, but the MASK signal masks every 8th pulse of the CLK2L signal.

Master Mode

A summer 107 adds a constant value 8 to the output data D6 of a multiplexer 108 to produce the input data D7 of accumulator 105. When the M/S signal indicates transceiver 64 is operate as the master, multiplexer 108 sets its output data D6 to 0 so that summer 107 holds D7 at a constant value of 8. Thus accumulator 102 will produce the repetitive τ data sequence: {0, 8, 16, 24, 32, 40, 48, 56, 0, 8, . . . } which can be represented by the expression, $\tau_n$ mod(8n,64), for n=0, 1, 2, 3, Thus when the transceiver operates in the master mode, the value of τ changes in a regular manner with each pulse of the CLK1L clock signal and is not influenced by any phase differences between the local and remote CLK1L and CLK1R clock signals. Accordingly the coefficients tables 84 and 96 supply to interpolation filters 80 and 93 are functions only of the local CLK1L clock signal and do not reflect any phase differences between the local and remote CLK1L and CLK clock signals.

Slave Mode

When the M/S signal indicates local transceiver 64 is to operate in the slave mode, multiplexer 108 supplies a data value D5 as the D6 input to summer 107. The D6 value represents a phase error with which interpolation filter 93 interpolates the R3x,a data sequence when generating the R2x,a data sequence. When there is no interpolation phase error, the current data element of the R2x,a sequence output of interpolation filter 93 will be a whole number having the same value as a corresponding element of the T2x,a sequence previously supplied as input to the interpolation filter 93 of the remote transceiver. Timing recovery system 74 includes a slicer 111 clocked by the CLK2L clock signal which rounds off each R2x,a sequence element to produce a data element D3. When there is no interpolation phase error, an R2x,a element will be a whole number the D3 output of slicer 111 will match its R2x,a sequence input. A phase error detector (PED) circuit 110 compares each R2x,a sequence element to its corresponding D3 element and when they are of the same value, PED 110 produces an output value D4 of 0. Filter 109 filters (smoothes) the D4 sequence to produce the D5 input to multiplexer 108. A zero phase start (ZPS) circuit 112 reset the output count of phase accumulator 105 to a predetermined value whenever it detects a peak in the R3x,a data, thereby establishing a initial zero interpolation phase.

Thus when the interpolation phase of filter 93 (which is controlled by τ) is correct, slicer 111, PED 110 and filter 109 tend to drive D5 to 0 so that accumulator 105 increments τ its normal rate of 8.

When interpolation filter 93 has an interpolation phase error, each R2x,a value will be a little larger or smaller than a whole number and will not match the corresponding D3 output of slicer 111 since slicer 111 rounds off each R2x,a value to the nearest whole number. PED 110 detects the difference between corresponding R2x,a and D3 elements and drives D4 positive or negative depending on whether the pattern of its input D3 sequence and the sign of the difference between the corresponding R2x,a and D3 elements indicate the interpolation phase error is negative or positive. A positive or negative D4 sequence input to filter 109 tends to drive its D5 sequence output above or below zero, thereby causing D7 to rise above or fall below 8. This advances or retards the value of τ, thereby advancing or retarding the interpolation phase of filter 93, as well as the interpolation phase of filter 80 and the phase of the local CLK3L clock signal. The feedback provided by timing recovery system 74 when operating in the slave mode thus adjusts τ to zero the interpolation phase error of filters 80 and 93, and to frequency lock the local CLK3L clock signal to the remote CLK3R clock signal so that data passes between local host 60 and remote host 62 at the same 125 MHz clock rate that is derived from the master transceiver's CLK1 clock signal.

The forgoing specification and the drawings depict the best mode(s) of practicing the invention, and elements or steps of the depicted best mode(s) exemplify the elements or steps of the invention as recited in the appended claims. However the appended claims are intended to apply to any mode of practicing the invention comprising the combination of elements or steps as described in any one of the claims, including elements or steps that are functional equivalents of the example elements or steps depicted in the specification and drawings. Accordingly should any appended claim describe an element or step only in terms of its function, then it is intended that the claim's description of the element be interpreted as reading on any element or step having the described function, regardless of any structural limitations associated with any example depicted in this specification or in the drawings.

What is claimed is:

1. A data communication method comprising the steps of:
   a. receiving elements of a first data sequence (Tx,a) at a first rate controlled by a first clock signal (CLK3L) and processing the first data sequence to generate elements of a second data sequence (T3x,a) at a second rate controlled by a second clock signal (CLK1L), wherein the second rate is higher than the first rate and wherein the second data sequence is an encoded version of the first data sequence;
   b. converting the second data sequence into an analog signal (A1) and transmitting the analog signal via a communication channel;
   c. receiving and processing the analog signal transmitted by the communication channel to generate elements of a third data sequence (R3x,a) at a third rate controlled by a third clock signal (CLK1R);
   d. processing the third data sequence (R3x,a) to generate elements of a fourth data sequence (Rx,a) at a fourth rate controlled by a fourth clock signal (CLK3R), wherein the fourth rate is lower than the third rate, and wherein the first and fourth data sequences are substantially similar and forwarding the fourth data sequence at the fourth rate;
   further comprising one of:
   e. deriving the first clock signal from the second clock signal, and
   f. deriving the fourth clock signal from the third clock signal;
   wherein step e comprises the substeps of:
     e1. generating a plurality of reference clock signals, each having edges occurring with a frequency matching the frequency of the second clock signal but with a unique phase; and e2. generating edges of the second clock signal in response to edges of the reference clock signals selected such that the resulting first clock signal has a time-average frequency substantially matching a frequency of the fourth clock signal;

and wherein step f comprises the substeps of:

f1. generating a plurality of reference clock signals, each having edges occurring with a frequency matching the frequency of the third clock signal but with a unique phase; and f2. generating edges of the third clock signal in response to edges of the reference clock signals selected such that the resulting fourth clock signal has a time-average frequency substantially matching that of the first clock signal.

2. The method in accordance with claim 1 wherein step a comprises the substeps of:

a1. masking portions of the second clock signal (CLK1L) to produce a fifth clock signal (CLK1L), and a2. shifting elements of the first data sequence (Tx,a) into a first-in, first-out (FIFO) buffer at the first rate controlled by the first clock signal (CLK3L);

a3. shifting elements of the first data sequence out of the first FIFO buffer at a fifth rate controlled by the fifth clock signal (CLK2L);

a4. processing the first data sequence as it is shifted out of the first FIFO buffer to generate the elements of the second data sequence (T3x,a) at the second rate controlled by the second clock signal (CLK1L), and wherein step d comprises the substeps of:

d1. masking portions of the third clock signal (CLK1R) to produce a sixth clock signal (CLK2R), d2. processing the third data sequence (R3,xa) to generate elements of the fourth data sequence (R1,a) at a sixth rate controlled by the sixth clock signal (CLK2R), d3. shifting elements of the fourth data sequence into a second FIFO buffer at a sixth rate controlled by the sixth clock signal (CLK2R), and d4. shifting elements of the fourth data sequence out of the second FIFO buffer and forwarding them at the fourth rate controlled by the fourth clock signal (CLK3R).

3. The method in accordance with claim 2 wherein substep a4 comprises the substeps of:

a41. trellis code modulation encoding the first data sequence as it is shifted out of the FIFO buffer to generate elements of a fifth data sequence (T2x,a), and a42. applying the fifth data sequence as input to a first filter which interpolates elements of the fifth data sequence (T2x,a) to produce elements of the second data sequence (T3x,a) at said second rate, and wherein substep d2 comprises the substeps of:

d21. applying the third data sequence as input to a second filter which interpolates elements of the third data sequence (T2x,a) to produce elements of a sixth sequence (R3x,a) at said third rate, and d22. trellis code modulation encoding the sixth data sequence to generate elements of the fourth data sequence (R1x,a) at the sixth rate.

4. The method in accordance with claim 3 wherein the first and second filters comprise finite impulse response (FIR) filters.

5. The method in accordance with claim 4 further comprising the steps of:

g. periodically adjusting the values of the first coefficients supplied as input to the first filter in response to the second clock signal, and h. periodically adjusting the values of the second coefficients supplied as input to the second filter in response to the third clock signal.

6. The method in accordance with claim 5 wherein the values of the second coefficients are adjusted in response to the sixth data sequence.

7. A transceiver comprising:

a source of a first clock signal having edges that are periodic with a first frequency;

first means for masking a portion of the edges of the first clock signal to produce a second clock signal (CLK2R) and for generating a periodic third clock signal of a second frequency lower than the first frequency, wherein the second frequency is substantially equal to a time-average frequency of occurrence of edges of the second clock signal;

second means for receiving and storing elements of a first data sequence (Tx,a) at a rate controlled by the third clock signal (CLK3L) and for reading out elements of the first data sequence at a rate controlled by the second clock signal;

third means for processing the first data sequence read out of the third means to generate elements of a second data sequence (T3x,a) at a rate controlled by the first clock signal (CLK1L), wherein the second data sequence is an encoded version of the first data sequence;

fourth means for generating a first analog signal (A1) having successive magnitudes controlled by the second data sequence;

fifth means for receiving and processing a second analog signal having successive magnitudes representing a third data sequence to generate elements of a fourth data sequence (R3x,a) at a rate controlled by the first clock signal (CLK1L);

sixth means for processing the fourth data sequence (R3x,a) to generate elements of a fifth data sequence (R1x,a) at a rate controlled by the second clock signal (CLK3L); and seventh means for receiving and storing the elements of the fifth data sequence at a rate controlled by the second clock signal and for reading out the elements of the fifth data sequence at a rate controlled by the third clock signal.

8. The transceiver in accordance with claim 7 wherein the third means comprises:

eighth means (79) for encoding the first data sequence read out of the third means to generate elements of a sixth data sequence (T2,xa); and ninth means (80) for interpolating the elements of the sixth data sequence (T2x,a) to produce the elements of the second data sequence (T3x,a) at said second rate.

9. The transceiver in accordance with claim 8 wherein the sixth means comprises:

tenth means (93) for interpolating the elements of the fourth data sequence (R3x,a) to generate elements of the seventh data sequence (R2x,a) at a rate controlled by the first clock signal (CLK1L); and eleventh means (94) for decoding the elements of the seventh data sequence to generate the elements of the fifth data sequence at a rate controlled by the second clock signal.

10. The transceiver in accordance with claim 9 wherein the first means adjusts the second frequency of the third clock signal and the time-average frequency of the second clock signal in response to the seventh data sequence.

11. The transceiver in occurrence with claim 9 wherein the ninth means comprises a first finite impulse response (FIR) filter producing each of the elements of the second data sequence as a weighted sum of a plurality of the elements of the sixth data sequence with weighting controlled by values of first coefficients applied as input to the first filter, and
wherein the tenth means comprises a second FIR filter producing each of the elements of the fifth data sequence as a weighted sum of a plurality of the elements of the seventh data sequence with weighting controlled by values of second coefficients applied as input to the second filter.

12. The transceiver in accordance with claim 11 wherein the first means adjusts the values of the first and second coefficients in response to the edges of the first clock signal.

13. The transceiver in accordance with claim 12 wherein the values to which the first means adjusts the first and second coefficients are functions of values of elements of the seventh data sequence.

14. The transceiver in accordance with claim 13 wherein the first means comprises:
a slicer (111) for rounding values of the elements of the seventh data sequence to produce corresponding elements of an eighth data sequence,
means (110-105) for generating a phase data value (D7) that is a function of a difference between the corresponding elements of the seventh and eighth data sequences,
an accumulator (105) for accumulating the phase data value to produce a sequence of control data values ($\tau$) and for asserting a mask signal whenever the control data value reaches a predetermined limit;
means (106) responsive to the mask signal for masking the edges of the first clock signal when the mask signal is asserted to produce the second clock signal;
means (100) for generating the third clock signal in response to the first clock signal and the control data value such that the second frequency is a function of the control data value, and
means (84 and 96) for producing the first and second coefficients as functions of values of elements of the control data sequence.

15. The transceiver in accordance with claim 14 wherein the means (100) for generating the third clock signal comprises:
means (101) responsive to the first clock signal for generating a plurality of reference clock signals, each having edges occurring with said first frequency but with each reference clock signal having a unique phase; and
means (103,104) for generating edges of the third clock signal in response to the edges of the reference clock signals selected in accordance with the values of the control data sequence.

16. A data communication method comprising the steps of:
a. receiving elements of a first data sequence (Tx,a) at a first rate controlled by a first clock signal (CLK3L) and processing the first data sequence to generate elements of a second data sequence (T3x,a) at a second rate controlled by a second clock signal (CLK1L), wherein the second rate is higher than the first rate and wherein the second data sequence is an encoded version of the first data sequence;
b. converting the second data sequence into an analog signal (A1) and transmitting the analog signal via a communication channel;
c. receiving and processing the analog signal transmitted by the communication channel to generate elements of a third data sequence (R3x,a) at a third rate controlled by a third clock signal (CLK1R);
d. processing the third data sequence (R3x,a) to generate elements of a fourth data sequence (Rx,a) at a fourth rate controlled by a fourth clock signal (CLK3R), wherein the fourth rate is lower than the third rate, and wherein the first and fourth data sequences are substantially similar and forwarding the fourth data sequence at the fourth rate;
e. deriving the first clock signal from the second clock signal;
f. deriving the fourth clock signal from the third clock signal;
g. periodically adjusting first coefficient values supplied as input to a first finite impulse response (FIR) filter in response to the second clock signal,
h. periodically adjusting second coefficient values supplied as input to a second finite impulse response filter in response to the third clock signal; and
wherein step e comprises the substeps of:
e1. generating a plurality of reference clock signals, each having edges occurring with a frequency matching the frequency of the second clock signal but with a unique phase; and
e2. generating edges of the second clock signal in response to edges of the reference clock signals selected such that the resulting first clock signal has a time-average frequency substantially matching a frequency of the fourth clock signal.

17. The method in accordance with claim 16 wherein step a comprises the substeps of:
a1. masking portions of the second clock signal (CLK1L) to produce a fifth clock signal (CLK1L), and
a2. shifting elements of the first data sequence (Tx,a) into a first-in, first-out (FIFO) buffer at the first rate controlled by the first clock signal (CLK3L);
a3. shifting elements of the first data sequence out of the first FIFO buffer at a fifth rate controlled by the fifth clock signal (CLK2L);
a4. processing the first data sequence as it is shifted out of the first FIFO buffer to generate the elements of the second data sequence (13x,a) at the second rate controlled by the second clock signal (CLK1L), and
wherein step d comprises the substeps of:
d1. masking portions of the third clock signal (CLK1R) to produce a sixth clock signal (CLK2R),
d2. processing the third data sequence (R3,xa) to generate elements of the fourth data sequence (R1,a) at a sixth rate controlled by the sixth clock signal (CLK2R),
d3. shifting elements of the fourth data sequence into a second FIFO buffer at a sixth rate controlled by the sixth clock signal (CLK2R), and
d4. shifting elements of the fourth data sequence out of the second FIFO buffer and forwarding them at the fourth rate controlled by the fourth clock signal (CLK3R).

18. The method in accordance with claim 17 wherein substep a4 comprises the substeps of:
- a41. trellis code modulation encoding the first data sequence as it is shifted out of the FIFO buffer to generate elements of a fifth data sequence (T2x,a), and
- a42. applying the fifth data sequence as input to a first filter which interpolates elements of the fifth data sequence (T2x,a) to produce elements of the second data sequence (T3x,a) at said second rate, and wherein substep d2 comprises the substeps of:
- d21. applying the third data sequence as input to a second filter which interpolates elements of the third data sequence (T2x,a) to produce elements of a sixth data sequence (R3x,a) at said third rate, and
- d22. trellis code modulation encoding the sixth data sequence to generate elements of the fourth data sequence (R1x,a) at the sixth rate.

19. The method in accordance with claim 18 wherein the values of the second coefficients are adjusted in response to the sixth data sequence.

20. A data communication method comprising the steps of:
- a. receiving elements of a first data sequence (Tx,a) at a first rate controlled by a first clock signal (CLK3L) and processing the first data sequence to generate elements of a second data sequence (T3x,a) at a second rate controlled by a second clock signal (CLK1L), wherein the second rate is higher than the first rate and wherein the second data sequence is an encoded version of the first data sequence;
- b. converting the second data sequence into an analog signal (A1) and transmitting the analog signal via a communication channel;
- c. receiving and processing the analog signal transmitted by the communication channel to generate elements of a third data sequence (R3x,a) at a third rate controlled by a third clock signal (CLK1R);
- d. processing the third data sequence (R3x,a) to generate elements of a fourth data sequence (Rx,a) at a fourth rate controlled by a fourth clock signal (CLK3R), wherein the fourth rate is lower than the third rate, and wherein the first and fourth data sequences are substantially similar and forwarding the fourth data sequence at the fourth rate;
- e. deriving the first clock signal from the second clock signal;
- f. deriving the fourth clock signal from the third clock signal;
- g. periodically adjusting first coefficient values supplied as input to a first finite impulse response (FIR) filter in response to the second clock signal,
- h. periodically adjusting second coefficient values supplied as input to a second finite impulse response filter in response to the third clock signal; and wherein step f comprises the substeps of:
- f1. generating a plurality of reference clock signals, each having edges occurring with a frequency matching the frequency of the third clock signal but with a unique phase; and
- f2. generating edges of the third clock signal in response to edges of the reference clock signals selected such that the resulting fourth clock signal has a time-average frequency substantially matching that of the first clock signal.

* * * * *

UNITED STATES PATENT AND TRADEMARK OFFICE
CERTIFICATE OF CORRECTION

| | | |
|---|---|---|
| PATENT NO. | : 7,106,753 B2 | Page 1 of 1 |
| APPLICATION NO. | : 10/057501 | |
| DATED | : September 12, 2006 | |
| INVENTOR(S) | : Leon Chia-Liang Lin | |

It is certified that error appears in the above-identified patent and that said Letters Patent is hereby corrected as shown below:

Column 16, line 53: Please replace the data sequence "13x,a" to --T3x,a--.

Signed and Sealed this

Twenty-sixth Day of December, 2006

JON W. DUDAS
*Director of the United States Patent and Trademark Office*